United States Patent
Sacharski et al.

(10) Patent No.: US 6,360,974 B1
(45) Date of Patent: Mar. 26, 2002

(54) POWDER SLURRY COATING COMPOSITION

(75) Inventors: Lawrence Sacharski, Eastpointe; Michael A. Gessner, West Bloomfield, both of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/314,404

(22) Filed: May 19, 1999

(51) Int. Cl.[7] ............................................. B02C 19/12
(52) U.S. Cl. ............................. 241/16; 241/21; 241/22
(58) Field of Search .......................... 241/172, 21, 16, 241/22

(56) References Cited

U.S. PATENT DOCUMENTS

| | | |
|---|---|---|
| 3,781,379 A | 12/1973 | Theodore et al. |
| 3,907,737 A | 9/1975 | Marx et al. |
| 3,943,082 A | 3/1976 | Smith et al. |
| 4,091,048 A | 5/1978 | Labana et al. |
| 4,100,315 A | 7/1978 | Lauterbach |
| 4,137,349 A | 1/1979 | Sakakibara et al. |
| 4,155,892 A | 5/1979 | Emmons et al. |
| 4,181,642 A | 1/1980 | Holle et al. |
| 4,243,565 A | 1/1981 | Nishino et al. |
| 4,268,542 A | 5/1981 | Sakakibara et al. |
| 4,312,795 A | 1/1982 | Taguchi et al. |
| 4,346,144 A | 8/1982 | Craven |
| 4,365,043 A | 12/1982 | Konishi et al. |
| 4,442,248 A | 4/1984 | Kanda et al. |
| 4,510,275 A | 4/1985 | Ihikura et al. |
| 5,055,524 A | 10/1991 | Pettit, Jr. et al. |
| 5,270,416 A | 12/1993 | Toman et al. |
| 5,378,756 A | 1/1995 | Thies et al. |
| 5,379,947 A | 1/1995 | Williams et al. |
| 5,612,397 A | 3/1997 | Gebhard et al. |
| 5,965,213 A | 10/1999 | Sacharski et al. |
| 6,029,920 A | * 2/2000 | Shimizu et al. ............. 241/172 |
| 6,159,556 A | 12/2000 | Möller et al. |

FOREIGN PATENT DOCUMENTS

| | | | |
|---|---|---|---|
| DE | 197 44 561 | 4/1999 | |
| GB | 1 521 354 | 8/1978 | |
| JP | 55152764 | 9/1993 | |
| WO | WO 95/28448 | 10/1995 | ............ C09D/5/03 |
| WO | WO 98/29465 | 7/1998 | ......... C08F/283/00 |

OTHER PUBLICATIONS

D. S. Richards, "Powder Coatings," Kirk–Othmer Encyclopedia of Chemical Technology, vol. 19, pp. 13, 16 (3d ed. 1982).

* cited by examiner

Primary Examiner—Mark Rosenbaum
(74) Attorney, Agent, or Firm—Anna M. Budde

(57) ABSTRACT

A powder slurry coating composition is prepared by adding individual particulate materials including at least one resin powder to an aqueous medium and then milling the dispersed particulate materials to produce a median particle size of up to about 15 microns. The powder slurry coating composition is used to prepare a coating on a substrate. The coating is equivalent to coatings obtained from powder slurry coating compositions in which the powder is produced by melt mixing in an extruder and grinding the extrudate.

20 Claims, 1 Drawing Sheet

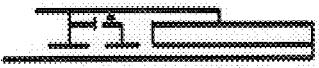

POWDER SLURRY COATING COMPOSITION

FIELD OF THE INVENTION

The invention concerns powder slurry coating compositions and processes for preparing such compositions.

BACKGROUND OF THE INVENTION

Powder coating technology avoids the regulated emissions from using solventborne coating compositions or waterborne coating compositions, which have some volatile organic content. Powder coatings, however, have unique technological challenges that result from the absence of a liquid medium, especially in preparing coatings that require high gloss or smoothness. One problem encountered with powder coatings is balancing the need for reducing the median particle size of the powder to obtain smoother coating films with the need to avoid a significant fraction of particles below about five microns that may present a dusting hazard in handling and applying the powder coating. Another problem is sintering of the powder particles during storage. Finally, it can be difficult to control film build in applying powder coatings even for fluidized methods because of variation in density of the powder in the air.

Recently, powder slurry technology has been used as a means for delivering powder coatings with finer median particle sizes or with a more significant fraction of low particle size material, while avoiding the dusting problem. In general, powder coatings have been prepared by first melt mixing all of the coating ingredients, typically including one or more solid resins and one or more pigments, in an extruder. The extrudate is then flaked and pulverized to the desired median particle size or particle size distribution. To prepare a powder slurry, a coarse powder coating powder with a larger particle size is dispersed in water, usually with one or more additives such as surfactants, dispersants, and thickeners. The dispersion is then milled to further reduce the median particle size of the dispersed powder. This method typically results in powder coating slurries that have a median particle size of about three to four microns or more. The water medium also keeps the particles separated and consequently avoids sintering of the particles.

In a similar process, U.S. Pat. No. 5,379,947 discloses a powder slurry coating with a particle size distribution in which at least half of the particles are between three and five microns and all of the particles are less than about ten microns. Because the powder particles are in the form of an aqueous slurry instead of a dry powder, the slurry avoids the dusting problem and associated problem of fine airborne particulates. The powder slurry is produced by first melt mixing all of the coating ingredients in an extruder and reducing the extrudate to a flake. The flake is then jet milled to a fine powder of the desired particle size distribution. The powder is dispersed in water with surfactant, dispersant, and thickener to make the powder coating slurry. While the powder slurry composition of U.S. Pat. No. 5,379,947 beneficially provides small median particle sizes, it is a lengthy process and the very fine jet-milled powder is difficult to disperse.

It would be desirable to reduce the time and cost involved in producing powder coating slurries. The step of preparing the melt extrusion is time-consuming and uses expensive equipment that is difficult to clean.

We have now discovered a simplified method of producing a powder slurry coating composition that matches the performance of powder slurry coating compositions produced by the old melt extrusion method.

SUMMARY OF THE INVENTION

The invention provides a process for preparing a powder slurry coating composition that includes steps of:
  (a) providing individual particulate materials including at least one resin powder and at least one further particulate material;
  (b) dispersing the individual particulate materials in an aqueous medium; and
  (c) milling the dispersed particulate materials to a maximum particle size of up to about 15 microns.

Two or more of the particulate materials may be mixed together before being added to the aqueous medium. The materials are not mixed on the sub-particle scale, as is done in the extruder melt mixing method, but instead each particle retains its individual identity. The particulate material added to the aqueous medium is thus heterogeneous. The milling of the dispersed particulate materials is thought to homogenize the dispersed particulate to some degree, as well as reduce the overall median particle size. In another aspect, the invention provides a powder slurry coating composition prepared according to the above process.

The powder slurry coating composition is used to prepare a coating on a substrate. The powder slurry coating composition can be applied to various substrates, including especially metal and plastic substrates. The powder coating may be applied to many different articles, such as, without limitation, furniture, wheels, appliances, tools and power tools, industrial and automotive parts, and containers. In one example, the powder slurry coating composition may be formulated for exterior vehicle applications, including primer coatings (also called filler coatings) and topcoat coatings, including basecoat and clearcoat coatings. The coatings prepared from the powder slurry coating compositions of the invention are equivalent in appearance to coating prepared by the melt-mix extrusion method, while having the advantage of being simpler and less expensive to manufacture.

BRIEF DESCRIPTION OF THE DRAWINGS

FIG. 1 is an electron microscopy photograph of a cross-section of the cured coating prepared from Example 1.

FIG. 2 is an electron microscopy photograph of a cross-section of the cured coating prepared from Comparative Example A.

DETAILED DESCRIPTION OF THE INVENTION

In a first step, at least two powdered or particulate ingredients of the powder coating are provided. The particulate ingredients may be added separate, together or sequentially, or the particulate ingredients may be dry mixed and added together as a mixture. The powered ingredients may be dry mixed using a suitable mixer, for example a Henchel mixer. The powdered ingredients include at least one resin and at least one further powdered coating material, preferably at least one further resin that is a curing agent reactive with the first resin or a pigment or filler material. In a preferred embodiment, the powdered ingredients include a resin, a curing agent reactive with the resin, and one or more pigments. Other materials, such as catalysts or other additives, may also be included.

The powdered ingredients include at least one resin and may include a combination of resins. The resin may be thermoplastic, but thermosetting compositions are preferred for automotive applications. A thermosetting composition will include a curable resin with functional groups that are reacted during cure to form a crosslinked network. While the curable resin may be self-crosslinking, the thermosetting composition usually includes at least one curing agent that reacts with the functional groups of the curable resin to crosslink the coating. Often, the curable resin will have a higher molecular weight than the curing agent, but it is also possible to combine two resins of comparable molecular weights that have mutually reactive groups.

A number of different resins are known to be useful for powder coating compositions, and in principle any of these may be used in powder form in the process of the invention. Resins suitable for use in the powder coating compositions and processes of the invention include, without limitation, vinyl resins including acrylics, polyesters, epoxy resins, aminoplast resins including melamine resins and glycouril resins, phenolic resins, dicarboxylic and polycarboxylic acid compounds and anhydrides of such compounds, saturated and unsaturated polyesters, polyurethanes, blocked isocyanate resins, and combinations of these.

Polyester resins may be formulated as acid-functional or hydroxyl-functional resins. The polyester may have an acid number of from about 20 to about 100, preferably from about 20 to about 80, and more preferably from about 20 to about 40 mg KOH per gram. In another embodiment, the polyester may have a hydroxyl number of from about 25 to about 300, preferably from about 25 to about 150, and more preferably from about 40 to about 100 mg KOH per gram. Many polyester resins are commercially available as powdered resins, such as those available under the tradename ALFTALAT from Hoechst, Portsmouth, Va.; under the tradename GRILESTA from EMS-American Grilon, Inc., Sumter, S.C.; under the tradename ALBESTER from McWhorter, and under the tradename ARAKOTE from CIBA-Geigy Corp., Ardsley, N.Y. The methods of making polyester resins are well-known. Typically, a polyol component and an acid and/or anhydride component are heated together, optionally with a catalyst, and usually with removal of the by-product water in order to drive the reaction to completion. The polyol component has an average functionality of at least about two. The polyol component may contain mono-functional, di-functional, tri-functional, and higher functional alcohols. Diols are preferred, but when some branching of the polyester is desired, higher functionality alcohols are included. Illustrative examples include, without limitation, alkylene glycols and polyalkylene glycols such as ethylene glycol, propylene glycol, diethylene glycol, triethylene glycol, and neopentyl glycol,; 1,4-butanediol, 1,6-hexanediol, 1,4-cyclohexane dimethanol, glycerine, trimethylolpropane, trimethylolethane, pentaerythritol, 2,2,4-trimethyl-1,3-pentanediol, hydrogenated bisphenol A, and hydroxyalkylated bisphenols. The acid and/or anhydride component comprises compounds having on average at least two carboxylic acid groups and/or anhydrides of these. Dicarboxylic acids or anhydrides of dicarboxylic acids are preferred, but higher functional acid and anhydrides can be used when some branching of the polyester is desired. Suitable polycarboxylic acid or anhydride compounds include, without limitation, those having from about 3 to about 20 carbon atoms. Illustrative examples of suitable compounds include, without limitation, phthalic acid, isophthalic acid, terephthalic acid, hexahydrophthalic acid, tetrahydrophthalic acid, pyromellitic acid, succinic acid, azeleic acid, adipic acid, 1,4-cyclohexanedicarboxylic acid, dodecane-1,12-dicarboxylic acid, citric acid, trimellitic acid, and anhydrides thereof.

Examples of useful epoxy resins are those having an epoxy equivalent weight of from about 500 to about 2000, preferably from about 600 to about 1000. Illustrative examples of useful epoxy resins include, without limitation, bisphenol A type resins, bisphenol F type resins, novolac epoxy resin, and alicyclic epoxy resins. A number of such epoxies are available commercially for powder coatings, for example from Dow Chemical Co., Midland, Mich. under the tradename D.E.R.; from CIBA-Geigy Corp. under the tradename ARALDITE; and from Hoechst under the tradename BECKPOX.

Suitable vinyl and acrylic resins typically have a glass transition temperature of from about 25° C. to about 80° C., preferably from about 40° C. to about 60° C. Useful acrylic resins may have one or more of the following functional groups: carboxyl groups, anhydride groups, hydroxyl groups, blocked isocyanate groups, epoxide groups, and amine groups. When the acrylic resin is hydroxyl functional, it may have a hydroxyl number of from about 20 to about 120 mg KOH/g. Acid functional acrylic resins may have an acid number of from about 20 to about 100 mg KOH/g. Epoxide-functional resins may have an epoxide equivalent weight of from about 200 to about 800. In general, the equivalent weight of the acrylic polymer is preferably from about 200 to about 1000, more preferably from abut 400 to about 900. Preferably, the acrylic resin has a weight average molecular weight of from about 6000 to about 40,000, more preferably from about 10,000 to about 25,000.

The desired functionality is usually introduced to the vinyl or acrylic polymer by copolymerizing a monomer having that functionality, but the functionality may also be added after the polymerization reaction, as in the case of hydrolysis of vinyl acetate groups to hydroxyl. Examples of functional monomers include, without limitation, hydroxyethyl acrylate, hydroxypropyl acrylate, hydroxybutyl acrylates, hydroxyethyl methacrylate, hydroxypropyl methacrylate, hydroxybutyl methacrylates, t-butylaminoethyl methacrylate, glycidyl acrylate, glycidyl methacrylate, allyl glycidyl ether, acrylic acid, methacrylic acid, crotonic acid, itaconic acid, maleic acid, fumaric acid, maleic anhydride, itaconic anhydride, isocyanatoethyl methacrylate, 1-(1-isocyanato1-methylethyl)-3-(1-methylethyenyl)benzene, and so on. Isocyanate groups may be blocked before polymerization of the monomer if desired, but the blocking can be done at any point. There are many suitable comonomers, including, without limitation, non-functional acrylic and methacrylic esters derived from alcohols having up to about 20 carbon atoms; vinyl esters, other vinyl compounds such as styrene, vinyl toluene, vinyl ethers, allyl ethers, and so on. Particular compounds that may be mentioned are methyl methacrylate, propyl methacrylate, butyl methacrylate, ethyl acrylate, styrene, methylstyrene, vinyltoluene, acrylamide, acrylonitrile and methacrylonitrile, vinyl halides and vinylidene halides, vinyl acetate, vinyl propionate, and so on. Combinations of comonomers may, of course, be used.

Curing agents that are solid at ambient temperatures are preferred, although it is possible to include in the powder slurry liquid curing agents. The liquid curing agents should be dissolved or emulsified in the aqueous phase. The solid curing agents are used as finely divided solids.

Preferred curing agents for hydroxyl functional resins include amino resins, including urea formaldehyde and melamine formaldehyde resins, and blocked isocyanate resins. Blocked isocyanate resins include blocked polyisocyanate compounds and blocked oligomers or prepolymers of polyisocyanate compounds including, without limitation, blocked isocyanurates, blocked biurets, blocked allophanates, and blocked isocyanate-functional prepolymers such as the reaction product of one mole of a triol with three moles of a diisocyanate. Illustrative examples of useful polyisocyanates compounds that can be blocked or used to prepare blocked isocyanate oligomers or prepolymers include, without limitation, isophorone diisocyanate, hexamethylene diisocyanate, toluene diisocyanate, methylene diphenyl diisocyanate, methylene dicyclohexyl diisocyanate, 2-methyl-1,5-pentane diisocyanate, 2,2,4-trimethyl-1,6-hexane diisocyanate, and 1,12-dodecane diisocyanate. Typical blocking agents for the isocyanate groups are oximes, lactams, malonic esters, secondary and tertiary monoalcohols, C—H acidic compound such as dialkylmalonates, acetyl acetone, alkyl esters of acetoacetic acid, oximes, phenols such as phenol or o-methylphenol, N-alkylamides, imides, or alkali metal bisulphites.

Preferred curing agents for acid functional resins include epoxide-functional epoxy resins and acrylic resins, as well as monomeric polyfunctional epoxide compounds such as triglycidyl isocyanurate, polyoxazolines, and polydioxanes. Curing agents for epoxy functional resins include polyamine and polyacid compounds and resins.

The powder resins (including solid curing agents) used in the powder slurry coating compositions of the invention will typically have a glass transition temperature ($T_g$) or softening point of at least about 30° C. Because the powder is slurried in water, the sintering of conventional powder coatings is not a consideration and the materials may thus have $T_g$s or softening points that are lower than would be feasible for traditional powder coatings. Preferably, the resin has a $T_g$ or softening pint of at least about 35° C., and more preferably at least about 40° C. The resin preferably has a softening point of no more than about 80° C., more preferably no more than about 70° C., and yet more preferably no more than about 60° C. The $T_g$ or softening point is determined using a standard test procedure suitable for the particular resin, for example using differential scanning calorimetry (DSC).

When added to the aqueous medium, the resins and curing agents have a median particle size of from about 10 to about 80 microns, preferably from about 15 to about 60 microns, and more preferably from about 20 to about 30 microns. The resins may be added separately or the powders mixed and added. Unlike the extrusion method, however, the powder particles are not melt mixed to be homogenous, and even in the mixture the particles retain their individual identities at the time that they are added to the aqueous medium.

In one preferred embodiment, one or more fillers and/or pigments are also added to the aqueous medium. Pigments and fillers typically have median particle sizes of at least about 0.5 microns and up to about 8 microns. Examples of suitable pigments and fillers include, without limitation, metal oxides such as red iron oxide and titanium dioxide, chromates such as barium chromate, molybdates, phosphates, silicates including magnesium silicate and fumed silica, sulfates such as barium sulfate, carbon black, talc, azo reds, quinacridones, perylenes, phthalocyanines, carbazoles, diarylide yellows, and so on. In a preferred embodiment, the pigment, filler, and resin powders are mixed together before being added to the aqueous medium. When carbon black or another low density pigment is employed, it is preferably mixed with at least one other, denser powder (pigment, filler, or resin) before being added to the aqueous medium.

The powder slurry is produced by adding the particulate materials individually or as a mixture to the aqueous medium. The aqueous medium preferably includes, in addition to the water, a surfactant and may include other additives. The surfactant is preferably added in an amount that reduced the surface tension of the water to about 30 dynes/cm or less. It has been found that surface tensions higher than about 30 dynes/cm may increase the tendency of the particles to float on the water, making it more difficult to produce the powder slurry. The surfactant can be anionic, nonionic, or cationic, but nonionic surfactants are preferred. Typical nonionic surfactants are based on polyethoxylated alcohols or polyethoxy-polyalkoxy block copolymers. Alkoxy and alkylphenoxy polyethoxylated alkanols are preferred. Examples of useful surfactants include those available under the trademarks PLURACOL® and PLURONIC® from BASF Corporation; under the trademark SURFYNOL® (SURFYNOL® 400 series) from Air Products Corporation; and under the trademarks TRITON® and TERGITOL® from Union Carbide Corporation. The surfactant may be included in amounts of from about 0.005% to about 4% by weight, preferably from about 0.02 to about 0.1% by weight, based on the weight of the slurry coating composition.

The aqueous mixture also preferably includes a dispersant. Suitable types of dispersants are anionic acrylic polymeric dispersing agents, nonionic dispersing agents, and combinations of these. Suitable examples of dispersants include, without limitation, those available under the trademark TAMOL® from Rohm and Haas, Philadelphia, Pa., and DISPERSE-AYD® from Elementis Specialties, Jersey City, N.J. The dispersant may be included in amounts of from about 0.5 to about 10% by weight, preferably from about 0.5 to about 5% by weight, based on the weight of the slurry coating composition.

The aqueous mixture also preferably includes a component that provides a desirable rheology to the powder slurry coating composition produced from the mixture. This component, referred to as the rheology control agent, is added to alter the rheology that the mixture or slurry would otherwise exhibit. It is often desirable to employ a rheology control agent that thickens the mixture and slurry at low shear to add stability to the dispersion, but shear thins for good application properties. Suitable rheology control agents may be anionic, nonionic, or cationic, with nonionic rheology control agents being preferred. Illustrative examples include, without limitation, associative thickeners, natural and synthetic clays, fumed silicas, and combinations of these. Associative thickeners include a block that is hydrophilic to ensure solubility or dispersibility of the associative thickener in water and a block that is hydrophobic and capable of associative interaction in the aqueous medium. Examples of hydrophobic groups include, without limitation, long-chain alkyl radicals such as dodecyl, hexadecyl, and octadecyl; alkaryl radicals including, without limitation, octylphenyl radicals and nonylphenyl radicals. Hydrophilic structures suitable for the hydrophilic structures suitable for the associative thickeners include, for example and without limitation, acrylic structures, ethylene glycol ethers, and polyurethanes, including polyester or polyether based polyurethanes. One preferred embodiment includes ACRYSOL RM-8 from Rohm & Haas Corporation. The rheology control agent may included in amounts of from about 0.5 to about 5% by weight, based on the weight of the powder slurry coating composition. Preferred amounts depend upon the particular rheology control agent or combination of rheology control agents used. Solid rheology control agents such as clays or silicas may alternatively be added to the aqueous phase along with the particulate ingredients.

Other additives that may be used include catalysts, defoamers or dearating agents such as benzoin, dispersion adjuvants, leveling agents, light stabilizers, UV absorbers, radical scavengers, antioxidants and biocides. Optionally, a small amount of a relatively slow-evaporating organic solvent, such as propylene glycol, may be added to aid in coalescing and leveling the film.

Catalysts, when used, are chosen according to the curing chemistry employed. For example, suitable catalysts for reactions involving epoxide groups and carboxylic acid groups are phosphonium salts of organic or inorganic acids, quaternary ammonium compounds, amines, imidazole and imidazole derivatives. Examples of suitable phosphonium catalysts are ethyltriphenylphosphonium iodide, ethyltriphenylphosphonium chloride, ethyltriphenylphosphonium thiocyanate, the complex of ethyltriphenylphosphonium acetate and acetic acid, tetrabutylphosphonium iodide, tetrabutylphosphonium bromide, and the complex of tetrabutylphosphonium acetate and acetic acid. Suitable imidazole catalysts are, without limitation, 2-styrylimidazole, 1-benzyl-2-methylimidazole, 2 methylimidazole, and 2-butylimidazole.

Powder slurry coating compositions for coatings with metallic or pearlescent effects may be produced by addition of slurries of reflective flake pigments such as aluminum pigment or pearlescent pigment to the milled powder slurry coating composition. The aluminum pigment or pearlescent pigment slurries are added after the final milling so that the flakes are not damaged in the milling process. The slurry of the flake pigment may contain up to about 40% by weight of the flake pigment and is formed by adding the flake pigment to a mixture of water and surfactant. The surfactant may be any of those already mention as useful in preparing the powder slurry composition. When used, the flake pigment is typically added in amounts of from about 1 % to about 20% by weight, preferably from about 2% to about 9% by weight, based on the weight of the solids content of the powder slurry composition. If aluminum pigment is used, it should of course be treated to make it suitable for an aqueous composition. Chromated aluminums, encapsulated aluminums, or aluminums with other passifying treatments are commercially available. A metallic or pearlescent powder slurry coating composition is filtered using a mesh size that will not remove the flake pigment.

The resins, pigments, and any other solids typically are from about 10% to about 60% by weight of the aqueous slurry. Preferably, the solid content of the slurry is from about 20% to about 50% by weight, and more preferably the solid content of the slurry is from about 30% to about 40% by weight.

The slurry of the crude mixture is then milled on appropriate equipment to produce the final powder slurry coating composition. Suitable equipment for milling include Netzsch mills and attritor mills. The milling operation produces a particle size distribution in which 100% of the solid material has a particle size of less than about 20 microns, preferably less than about 15 microns, and more preferably less than about 12 microns. The median particle size should be between about 1 micron and about 15 microns, preferably between about 2 microns and about 10 microns, and more preferably between about 3 microns and about 6 microns. In one particularly preferred embodiment the median particle size is from about 3.8 to about 4.5 microns. The optimum particle size distribution may vary depending upon factors known to the person skilled in the art, notably the particular composition (e.g., types and amounts of surfactant, dispersant, etc., types of resins and pigment, and so on), mixing equipment, or application equipment used to apply the powder slurry composition to the substrate being coated. The particle size distribution can be optimized by straightforward testing.

The powder slurry coating composition may be filtered, for example using a nylon filter of appropriate mesh size.

The powder slurry coating compositions of the invention may be formulated as automotive primer, or filler, coating compositions, The powder slurry primer coating composition is applied to the substrate before the topcoat coating layer or layers. Primer compositions include resins such as polyesters and epoxies along with suitable curing agents. Primer compositions typically include one or more filler materials such as barytes, talc, silicates, and carbonates. Typical pigments for primers include titanium dioxide, carbon black, and red iron oxide.

The powder slurry coating compositions may also be formulated as an industrial topcoat, for example for motorized vehicles such as automobiles and motorcycles or for power equipment such as lawn mowers. In particular, the topcoat may be a basecoat or a clearcoat composition. Basecoat and clearcoat compositions are formulated for outdoor durability with materials that resist discoloration and degradation during outdoor exposure. Basecoat compositions contain one or more pigments to obtain the desired color. In addition, the basecoat powder slurry coating compositions can be tinted using minor amounts of traditional solvent-containing tinting pastes, either solventborne tinting pastes or waterborne tinting pastes with cosolvent. Tinting pastes are added in small amounts, typically no more than about 0.5% by weight. Clearcoats are not pigmented.

The powder slurry coating composition may be formulated as a can coating composition, a coil coating composition, and other industrial coating compositions. In one preferred embodiment, the powder slurry coating composition is an appliance coating composition.

The powder slurry coating compositions may be applied to a substrate by any suitable means. Typically the powder slurries are applied by spraying, for example with a siphon gun, by airless spraying, or by pressurized spraying. Electrostatic applications are possible for conductive substrates. Typical film thicknesses are from about 25 to about 75 microns (about 1 to about 3 mils), and thickness for automotive clearcoats may be about 50 microns (about 2 mils). Specifications for automotive clearcoats typically have a window of plus or minus about 10 microns (a little less than half a mil).

The applied powder slurry coating is flashed to at least partially dry the applied coating and then may be heated so that the applied coating flows into a smooth coating layer, and optionally cures. The applied coating may be flashed with infrared or heat, preferably with a pre-bake of about 10 minutes at about 120° to about 140° F. (about 48° to about 60° C.). The dried layer may then be baked or cured at a suitable temperature, typically from about 280° F. to about 400° F. (from about 138° to about 200° C.) for from about one minute to about 60 minutes, preferably from about 20 minutes to about 40 minutes. The cure temperature and time may be adjusted for the particular coating application, for example can coatings and coil coating are typically cured at higher temperatures for a short time (e.g., one minute) while vehicle coatings are cured at lower temperatures for longer times (e.g., 20 to 30 minutes).

When the powder slurry composition is a clearcoat composition and is being applied over an uncured basecoat layer, the basecoat should be "flashed" (dried for a period of time)

before the clearcoat slurry is applied. It is standard practice in the art to flash the applied basecoat layer before applying the clearcoat composition, whether the clearcoat composition is aqueous or solventborne. In the case of a waterborne basecoat composition, the basecoat layer is typically heated for two to ten minutes to drive off most of the water. The applied powder slurry clearcoat layer may be similarly flashed before the basecoat and clearcoat layers are heated to coalesce the clearcoat layer and cure both basecoat and clearcoat layers.

The invention is further described in the following example. The example is merely illustrative and does not in any way limit the scope of the invention as described and claimed. All parts are parts by weight unless otherwise noted.

EXAMPLE 1

Part A. Powder Mixture

A powder slurry primer coating composition is prepared by first preparing a mixture of a powdered resin and pigment. The resins are dry ground to a median particle size of about 30 microns before mixing. The mixture is prepared with 10.4 parts by weight of an acid-functional polyester having an acid number of about 34 mg KOH/g, 2.8 parts by weight of an epoxy resin having a weight per epoxide of about 650–725, 1.2 parts by weight of an anti-cratering additive (acid-functional acrylic resin), 0.6 parts by weight of a wax, 2.9 parts by weight of an adhesion promoter/epoxy blend material (10% by weight of the adhesion promoter), 0.07 parts by weight reactive flow agent, 5.9 parts by weight titanium dioxide pigment, 0.03 parts by weight carbon black pigment, and 5.9 parts by weight barium sulfate.

Part B. Aqueous Medium

Next, the following are mixed for about fifteen minutes in a separate container equipped with a cowles dispersing blade: 52.4 parts by weight of deionized water, 1.1 parts by weight of an anionic/nonionic dispersing agent (35% by weight in a water/propylene glycol blend), 0.02 parts by weight of a nonionic, polyethoxylated surfactant, 0.4 parts by weight of a nonionic associative thickener, 2.5 parts by weight of a 5% by weight dispersion of a synthetic clay in deionized water, and 0.2 parts by weight of propylene glycol.

Part C. Preparation of the Powder Slurry Coating Composition

The resin/pigment mixture of Part A was added slowly with stirring to the aqueous medium of Part B. Mixing was continued for about fifteen minutes. The slurry mixture was then milled in an attritor mill for three hours at 230 RPM at 68° F. until the median particle size is between about 4 and about 5.5 microns. The milled product is filtered through a 55 micron nylon filter. After filtering, 1.8% by weight of a nonionic associative thickener is added slowly to the slurry. The slurry is then mixed for fifteen minutes.

COMPARATIVE EXAMPLE A

A powder slurry coating composition is prepared using the same materials in the same amounts as in Example 1, but using a different procedure to prepare the Part A powder material.

Part A. Homogenous Powder

All of the materials of Part A are melt mixed in an extruder. The extrudate is pulverized and ground to a median particle size of 23 microns. The powder particles of Comparative Example A are thus homogenous, in contrast to the mixture of different particles from the different materials in the Part A powder mixture of Example 1.

Part B. Aqueous Medium

The aqueous medium is prepared according to Part B of Example 1.

Part C. Preparation of the Powder Slurry Coating Composition

The homogenous powder of Comparative Example A is then formulated into a powder slurry coating according to the method of Part C of Example 1.

Evaluation of the Powder Slurry Coating Composition

A pressure pot sprayout of a powder slurry coating composition prepared according to Example 1 and cured at 300° F. for 30 minutes, produced panels (4-by-12-inch steel panels) with a gloss reading of 63 at a 60-degree angle. Panels coated by a pressure pot sprayout of a powder slurry coating composition prepared according to Comparative Example A and cured at 300° F. for 30 minutes were made for comparison. The powder slurry coating compositions were applied over electrocoat primed steel panels. Electron microscopy photographs of a cross-section of the cured coating, taken with a Topcon SM-510 SEM equipped with an Orion digital imaging system, showed that the coating layer prepared from Example 1, the photograph of FIG. 1, had pigment particles that were equivalent in size and distribution to the pigment particles in the coating layer prepared from the extruded Comparative Example A, the photograph of FIG. 2. The layers in the lower half of the photographs show the electrocoat primers. The upper layer in FIG. 1 is of the cured coating composition prepared from Example 1. The upper layer in FIG. 2 is of the cure coating composition prepared from Comparative Example A.

The invention has been described in detail with reference to preferred embodiments thereof. It should be understood, however, that variations and modifications can be made within the spirit and scope of the invention and of the following claims.

What is claimed is:

1. A method for preparing a powder slurry coating composition, comprising steps of:
   (a) providing individual particulate materials including at least a resin and at least one further particulate material, wherein the particulate materials have a median particle size of from about 10 to about 80 microns;
   (b) dispersing the individual particulate materials in an aqueous medium comprising an associative thickener; and
   (c) milling the dispersed particulate materials to produce a powder slurry coating composition having a median particle size of up to about 20 microns.

2. A method according to claim 1, wherein the individual particulate materials are dry mixed before the dispersion step (b).

3. A method according to claim 1, wherein the individual particulate materials of step (a) include a curing agent reactive with at least one resin of the individual particulate materials.

4. A method according to claim 3, wherein the curing agent is selected from the group consisting of aminoplast resins, phenolic resins, dicarboxylic and polycarboxylic acid and acid anhydride compounds, blocked isocyanate resins, and combinations thereof.

5. A method according to claim 1, wherein the individual particulate materials of step (a) include a pigment or filler material.

6. A method according to claim 1, wherein the further particulate material comprises a second resin.

7. A method according to claim 1, wherein the individual particulate materials of step (a) include at least one member selected from the group consisting of vinyl resins, acrylic resins, polyester resins, epoxy resins, polyurethane resins, and combinations thereof.

8. A method according to claim 1, wherein the individual particulate materials of step (a) have a median particle size of from about 15 to about 60 microns.

9. A method according to claim 1, wherein the individual particulate materials of step (a) have a median particle size of from about 20 to about 30 microns.

10. A method according to claim 1, wherein the aqueous medium further comprises a member of the group consisting of a surfactant, a dispersant, and combinations thereof.

11. A method according to claim 1, wherein the aqueous medium comprises a nonionic surfactant.

12. A method according to claim 11, wherein the nonionic surfactant is an alkylphenoxy polyethoxylated alkanol.

13. A method according to claim 1, wherein the aqueous medium comprises a dispersant.

14. A method according to claim 13, wherein the dispersant is an anionic acrylic polymer.

15. A method according to claim 1, wherein the powder slurry coating composition comprises propylene glycol.

16. A method according to claim 1, wherein the powder slurry coating composition has a median particle size of up to about 12 microns.

17. A method according to claim 1, wherein the powder slurry coating composition has a median particle size of from about 1 micron to about 15 microns.

18. A method according to claim 1, wherein the powder slurry coating composition has a median particle size of from about 3 microns to about 6 microns.

19. A method according to claim 1, wherein the powder slurry coating composition has a median particle size of from about 3.8 microns to about 4.5 microns.

20. A method according to claim 1, wherein the powder slurry coating composition is a clearcoat composition.

* * * * *